United States Patent [19]

Heffron

[11] Patent Number: 5,037,248

[45] Date of Patent: Aug. 6, 1991

[54] CUTTER FOR MONOTONIC CUTTING MACHINE

[75] Inventor: Allan J. Heffron, Midland, Mich.

[73] Assignee: Ingersoll CM Systems Inc., Midland, Mich.

[21] Appl. No.: 283,597

[22] Filed: Dec. 13, 1988

Related U.S. Application Data

[63] Continuation-in-part of Ser. No. 49,607, May 13, 1987, Pat. No. 4,790,698.

[51] Int. Cl.$^5$ ............................................. B23P 15/42
[52] U.S. Cl. ...................................................... 707/12
[58] Field of Search .................... 407/12, 51, 19, 14, 407/15, 16, 34, 48, 57, 60

[56] References Cited

U.S. PATENT DOCUMENTS

| | | |
|---|---|---|
| 1,899,608 | 2/1933 | Bullard . |
| 2,044,494 | 6/1936 | Bullard . |
| 2,044,495 | 6/1936 | Bullard . |
| 2,090,119 | 8/1937 | Groene et al. . |
| 2,186,417 | 1/1940 | Kraus .................. 144/219 |
| 2,267,182 | 12/1941 | Wildhaber . |
| 2,407,921 | 9/1946 | Deliso .................. 407/12 |
| 2,553,966 | 5/1951 | Groene . |
| 3,818,562 | 6/1974 | Lacey .................. 407/48 |
| 4,464,086 | 8/1984 | Bentjens .................. 407/63 |
| 4,789,273 | 12/1988 | Wiacek et al. .................. 407/34 |
| 4,790,698 | 12/1988 | Heffron .................. 51/105 EC |
| 4,799,839 | 1/1989 | Berstein et al. . |
| 4,801,226 | 1/1989 | Gleason . |

FOREIGN PATENT DOCUMENTS

3525514A1 1/1987 Fed. Rep. of Germany .

Primary Examiner—Frederick R. Schmidt
Assistant Examiner—Lawrence Cruz
Attorney, Agent, or Firm—Gifford, Groh, Sprinkle, Patmore and Anderson

[57] ABSTRACT

An improved cutter disk for machining rotating workpieces, and in particular an improvement in such cutters useful in monotonic-type cutters in which the tool inserts carried on the disk are mounted in such a manner as to present the inserts to the workpiece at a radical lead angle, optimally on the order of 60 degrees. The tool inserts are preferably carried on both sides of a V-shaped edge on the cutter disk. Chip gullets are formed in the disk parallel to the tool inserts and are angled with respect to the plane of the disk. This optimizes the space for chip gullets and allows either a doubling of the feed rate for a given chip thickness and insert density, or a reduction in chip thickness by 50% for a given feed rate. The invention also results in the optimal use of space for the chosen insert density, especially on narrow cutters, and permits an improvement in the pocket strength and insert strength, as well as improving tool life.

14 Claims, 3 Drawing Sheets

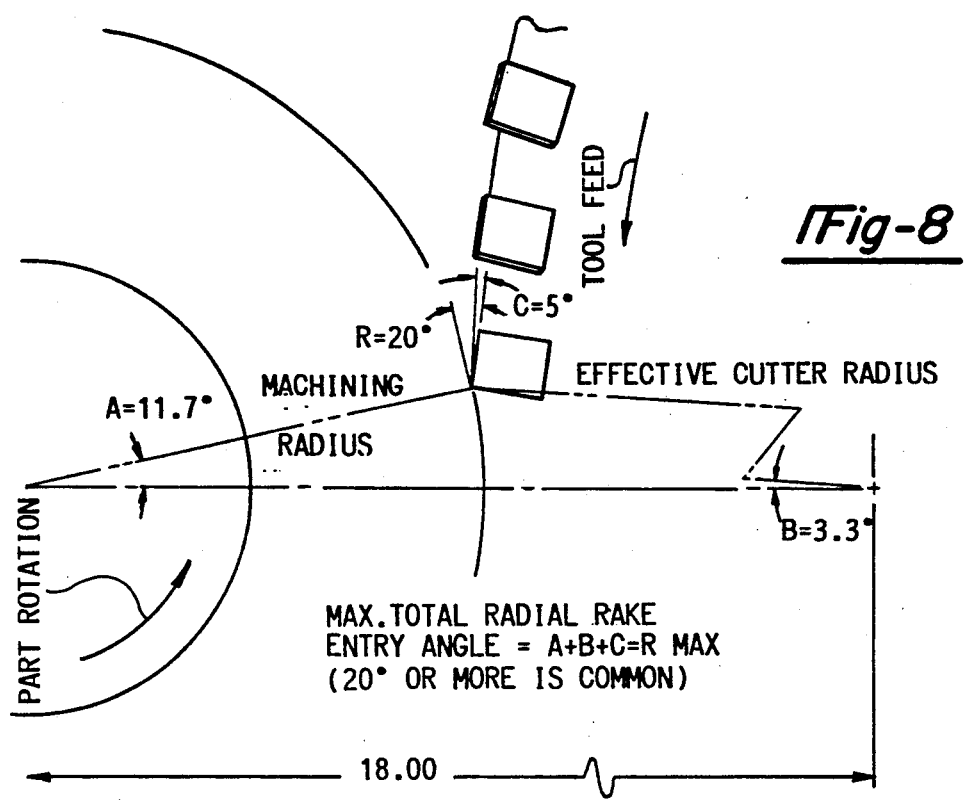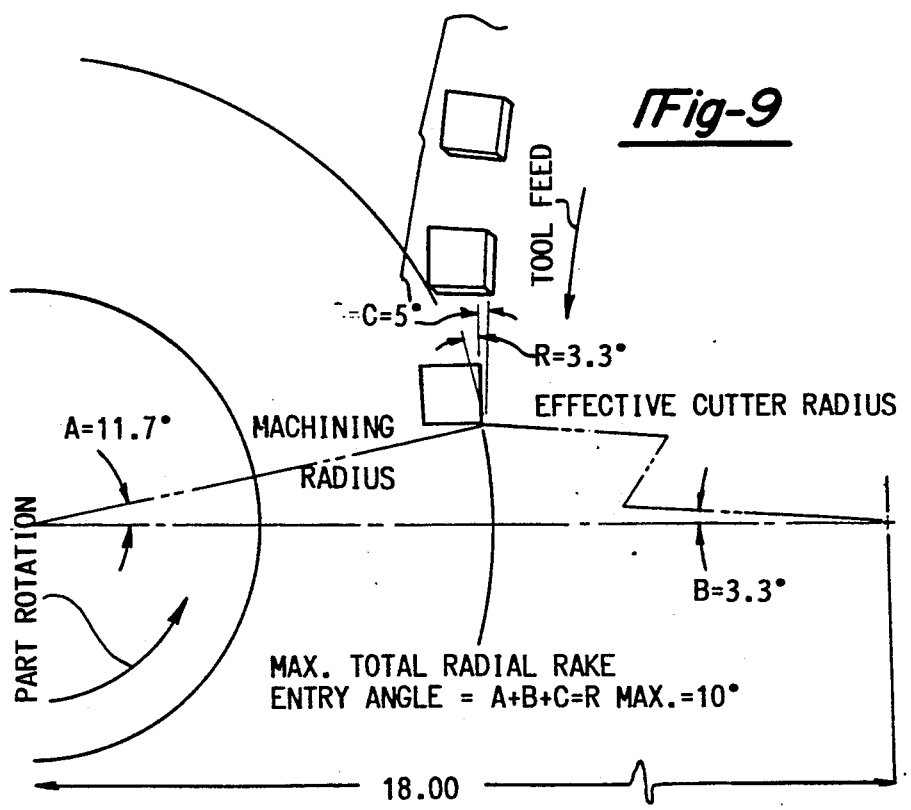

CUTTER FOR MONOTONIC CUTTING MACHINE

CROSS REFERENCE TO RELATED APPLICATION

This application is a continuation-in-part of Applicant's copending application Ser. No. 049,607, filed May 13, 1987, which issued as U.S. Pat. No. 4,790,698 on Dec. 13, 1988. That application is expressly incorporated by reference herein.

BACKGROUND OF THE INVENTION

I. Field of the Invention

The present invention is directed to machining tools and more particularly to an improvement in monotonic broach cutters.

II. Description of the Prior Art

Monotonic broach-type cutters employ tool inserts carried on a rotatable disk for performing machining operations on a workpiece, for example, for facing or cheeking faces of counterweights on a crankshaft. The tool inserts can be carried on either or both of the outer circumfery of the disk and the face of the disk. In each case a chip gullet is provided in the disk adjacent to each individual tool insert in order to allow chips which are machined from the workpiece to be removed. The portion of the disk (including any set screw, retaining plate or other retaining means) which receives each tool insert, together with its associated gullet, defines a pocket.

Tools mounted in either fashion have a lead angle with respect to the workpiece of only a few degrees, usually equal to the side clearance angle, or "dish" angle. Because of further necessary negative clearance angles, these conventional tool inserts require an approximately 5-7 degree negative injury clearance angle.

While monotonic broach-type cutters function adequately for their intended purpose, their use has entailed some drawbacks. The cutting speed of these cutters has been extremely limited due to the required negative clearance angles and to limitations on the chip thickness which may be adequately removed. As a practical matter, when considered with the desired density for the tool inserts, space limitations severely inhibit the possible size of the chip gullets.

It should be noted that while cutters of these two types are disclosed in FIGS. 1-4, these specific cutters are not admitted to be prior art applicable against the present invention, especially in the disclosure of the radial stepping of the inserts, as taught by Applicant's own parent application. The specific cutters shown in FIGS. 1-4 are disclosed merely to exemplify certain known features of prior cutting disks used in both monotonic broach-type and other types of cutting and milling machines.

SUMMARY OF THE PRESENT INVENTION

The present invention overcomes these and other problems by providing a pocket construction for monotonic broach-type cutters which doubles the useful feed rate for a given chip thickness and tool insert density. The pocket construction of the present invention comprises a tool insert and a means for mounting the insert so that the insert is presented to the workpiece at a radical lead angle. The radical lead angle is greater than the conventional, few degree lead angle of prior inserts in such cutters. Preferably, the radical lead angle is much greater than the prior lead angles, and is optimally 45 to 60 degrees. The mounting means includes a portion of the cutter disk (including any screw, retainer or the like) dimensioned to closely receive and/or abut with as much as three full sides of the insert. The pocket includes this closely dimensioned disk portion and an associated chip gullet. The pocket is disposed at a significant angle with respect to a plane passing through the insert and the axis of the disk.

The present invention has several advantages over prior art cutters. The cutter construction of the present invention allows a reduction in chip thickness of 50% for a given feed rate. This means that for a given chip thickness and a tool insert density the feed rate of the cutter can be doubled. The angling of the pocket permits the space used for the chip gullets to be optimized (that is, typically to be minimized for a given material removal rate). The pocket also permits an optimum match of disk space to insert density, especially for narrow cutters. Such optimal use of space permits the insert to be supported by the disk on as many as three of its sides, thereby improving the strength of the pocket, since the stresses which are evolved during machining and translated to the pocket through the insert are spaced over a greater surface area.

The present invention also provides advantages with respect to utilization of and particularly the life of tool inserts. The mechanical strength of each insert is improved because the unsupported negative radial clearance angle is eliminated, thereby obviating a source of chipping or fracture of the insert. The inserts and the pockets can have between two and seven degrees of clearance in the opposite direction, thereby reducing the maximum radial rake angle by ten degrees, more or less, which significantly increases the strength of the cutting edge, hence increasing cutting efficiency. Utilization of the cutting edge of the tool is maximized because the cut made by the insert is spread over more of the length of the cutting edge of the insert. The frictional heat evolved upon cutting is thereby also spread over more of the area of the insert. These factors together significantly improve the useful life of the tool inserts, resulting in less down-time and greater productivity of the cutter.

BRIEF DESCRIPTION OF THE DRAWING

A better understanding of the present invention will be had upon reference to the following detailed description, when read in conjunction with the accompanying drawing, wherein like referenced characters refer to like parts throughout the several views, and in which:

FIG. 8 is an illustration of the geometry of conventional monotonic tools; and

FIG. 9 is an illustration of the geometry of an improved tool according to the present invention.

DETAILED DESCRIPTION OF THE PREFERRED EMBODIMENT OF THE PRESENT INVENTION

The present invention can best be understood as an improvement in prior cutting disks. The disks incorporating the present invention are most advantageously of the kind of cutter disks 32, 34 and 36 disclosed in parent application Ser. No. 049,607, incorporated by reference herein. In general, cutter disks of both this type and other types have tool inserts mounted on them on their edges, on their faces, or on both.

Figure 1:
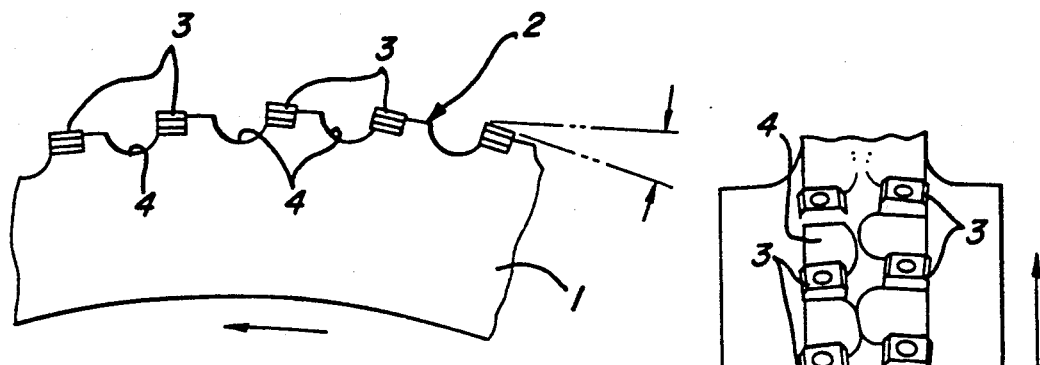
FIG. 1 is a side view of a portion of a cutter incorporating edge-mounted tool inserts affixed in a known fashion.
Figure 2:
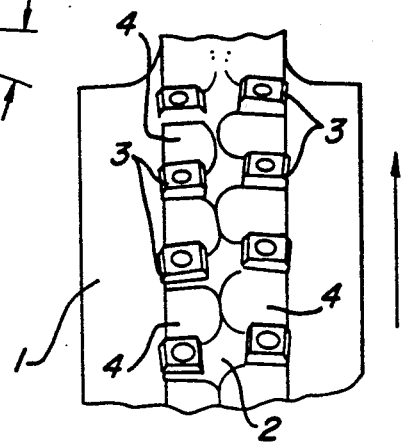
FIG. 2 is an end view of the portion shown in FIG. 1.

With reference first to FIGS. 1 and 2, a typical disk 1 of the first kind includes an edge portion 2 dimensioned to receive a plurality of tool inserts 3 thereon. Each of the tool inserts 3 is disposed generally parallel to the axis of rotation of the disk 1. The tool 3 thereby presents a zero or very small lead angle with respect to the workpiece. A chip gullet 4 is formed in the edge portion 2 of the disk 1 adjacent the insert 3.

Figure 3:
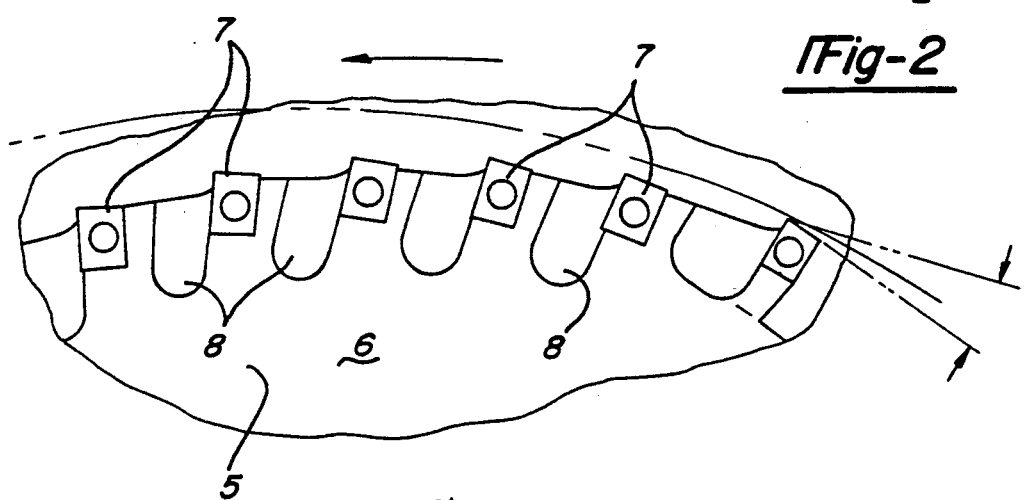
FIG. 3 is a side view of a portion of a cutter incorporating face-mounted tool inserts affixed in a known fashion.
Figure 4:
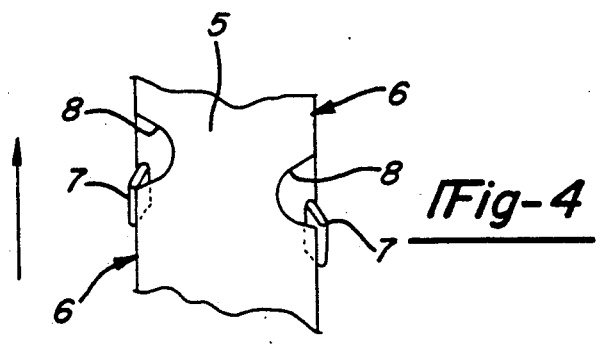
FIG. 4 is an end view of the portion shown in FIG. 3.

With reference now to FIGS. 3 and 4, a typical disk 5 of the second kind includes a pair of opposed face portions 6 dimensioned to receive a plurality of face inserts 7 therein. The portion 6 includes a plurality of chip gullets 8 each disposed adjacent one of the inserts 7. Each of the inserts 7 generally possesses a cutting edge which is radially aligned with the access of rotation of the cutter so that a very low angle is presented with respect to the workpiece being machined.

Figure 5:
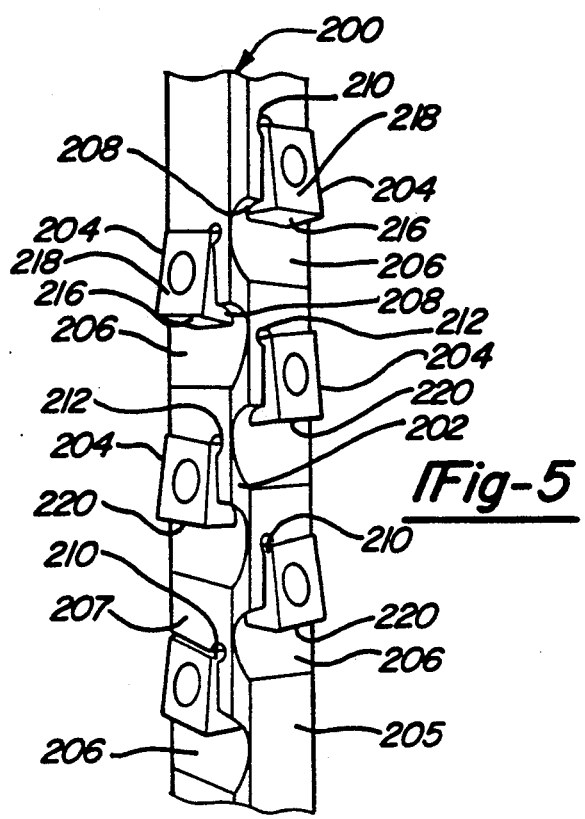
FIG. 5 is an end view of the preferred embodiment of the present invention.
Figure 7:
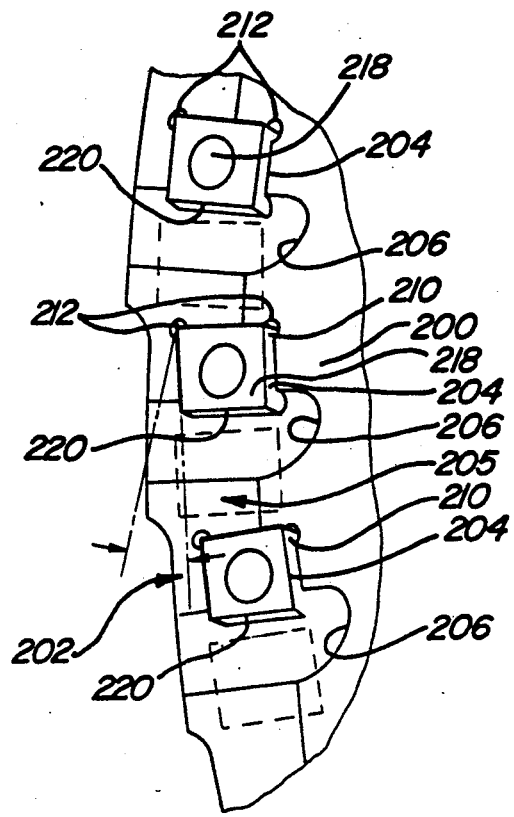
FIG. 7 is a side view of the preferred embodiment of the present invention.
Figure 6:
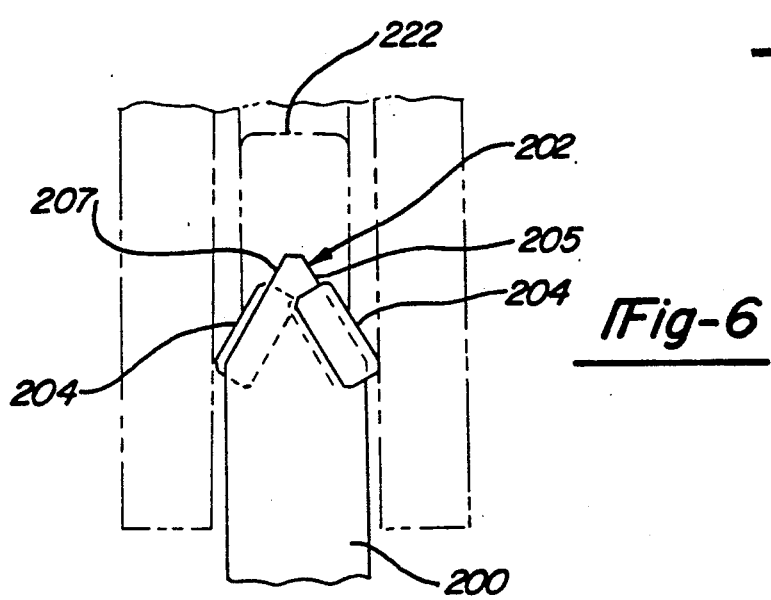
FIG. 6 is a cross-sectional view taken along line 6—6 of FIG. 5.

The improvement of the present invention is shown in FIGS. 5-7. A cutter disk 200 comprises a V-shaped circumfery 202 including a pair of sides 205 and 207 on which a plurality of tool inserts 204 are disposed. Preferably, these inserts 204 are disposed in a sequentially radially stepped fashion, like the disks 32, 34 and 36 in the parent application. Indeed, the most advantageous use of the present invention is in an apparatus as disclosed in the parent application.

A gullet 206 is formed in the V-shaped circumfery 202 of the disk 200 adjacent to each of the inserts 204. As illustrated, each of the inserts 204 may include a semicylindrical extension 208 which extends into the gullet 206. Each insert 204 is fitted within a pocket 210. Each pocket 210 has defined therein a pair of holes 212 for corner relief on the sides 205 and 207 of the circumfery 202. The inserts 204 are retained on the sides 205 and 207 by any conventional means such as by cement, a cap screw, a clamp or the like.

Each of the inserts 204 includes a relatively small cutting face 216 adjacent the semicylindrical extension 208. Each cutting face 216 makes about a two to seven degree positive angle with respect to a plane passing through the axes of a desired workpiece 222 and the disk 200. That is, the angle is two to seven degrees positive from the vertical with respect to the surface being machined. Each of the inserts 204 also includes a relatively larger outer face 218 extending from the cutting face 216. Each outer face 218 makes a five degree outward angle with respect to a tangent to the circumfery side 205 or 207. A cutting edge 220 of each insert 204 is located at the intersection of the faces 216 and 218 and makes a radical lead angle with respect to the workpiece 222. This lead angle is greater than, and preferably significantly greater than, the few degree lead angle employed in earlier cutter inserts. Optimally, the lead angle is 45 to 60 degrees, that is, the cutting edge 220 is disposed at about 30 degrees with respect to the plane of the disk 200.

The gullets 206, like prior gullets, are disposed generally parallel to the inserts 204 with which they are associated. However, because of the radical lead angle, unlike prior gullets the gullets 206 are more open to the environment than are the perpendicular or parallel gullets of prior edge or face-type gullets. The gullets thereby more readily permit material removal from the machined area of the workpiece 222.

With reference to FIGS. 8 and 9, these references depict the cutting geometry improvement of the present design over conventionally known designs with double helix or lead angle facing tools. FIG. 8 is an illustration of the geometry of conventional monotonic tools while FIG. 9 is an illustration of the geometry of an improved tool according to the present invention.

According to conventional designs, the machined face radius is produced with the *leading* edge of the cutting tool which, because of necessary injury clearance angles, results in a higher than desirable rake angle or negative entry angle (R).

Conversely, and with particular reference to FIG. 9, the design of the present invention produces the machined face radius with the *trailing* edge of the cutting tool so that the injury clearance angle actually reduces the negative entry angle (R) by a factor of two times the injury clearance angle as compared with conventional designs. This single characteristic results in a much stronger cutting edge being applied to the workpiece in all possible cutting positions without sacrificing optimum injury clearance angles.

The cutter pocket construction of the present invention is most useful in the type of monotonic broach cutter described in Applicant's copending application Ser. No. 049,607. More particularly, it is most useful for a cutter whose inserts are radially stepped and which is then rotated with respect to a rotating workpiece so as to sequentially bring inserts closer to the axis of rotation of the workpiece. Rotation of the workpiece against each insert in the sequence of inserts brings about machining of the workpiece. Further details of operation of cutters of this type are disclosed in that application, which is incorporated by reference herein, so that the details of such operation need not be repeated.

The present invention possesses the several advantages mentioned earlier, and these advantages need not be repeated. The invention having been described, however, many modifications thereto will become apparent to those skilled in the art to which it pertains, without deviation from the spirit of the present invention, as defined by the scope of the appended claims.

What is claimed is:

1. An apparatus for machining a workpiece, comprising:
    means for rotating said workpiece about a first axis at a first rotational speed;
    a planar disk;
    means for rotating said disk about a second axis perpendicular to said disk at a second rotational speed substantially less than said first rotational speed, said second axis being parallel to said first axis;
    a sequential plurality of tool inserts attached to said disk at circumferentially spaced positions, said tool inserts increasing in radial distance from said second axis from one angular position on said disk to the next, and each of said tool inserts including a cutting edge; and means for mounting said tool inserts to said disk so as to present said cutting edges of said tool inserts at an angle with respect to said disk adequate to provide each of said tool inserts with a radical lead angle with respect to said workpiece.

2. The apparatus according to claim 1, wherein said means for rotating said disk comprises an arbor on which said disk is mounted, and means for rotating said arbor at a variable speed.

3. The apparatus according to claim 1, wherein said workpiece rotating means comprises a lathe bed and at least one chunk attached to said bed, said chuck receiving a part of said workpiece therein.

4. The apparatus according to claim 1, further comprising means for coordinating the speeds of said workpiece rotating means and said disk rotating means so as to match the feed rate of individual ones of said tool inserts on said disk with the linear surface velocity of said workpiece where engaged by said individual tool inserts.

5. The apparatus according to claim 4, wherein during a single rotation of said disk, the rate of rotation of said disk is set by said speed coordinating means to at least two different values.

6. The apparatus according to claim 1, further comprising at least a second disk having an associated plurality of tool inserts attached to it at circumferentially spaced positions, and means for rotating said second disk about said second axis in the same direction as said first-mentioned disk.

7. The apparatus according to claim 1, wherein said first and second axes are fixed with respect to each other.

8. The apparatus according to claim 1, wherein said disk includes a circumfery, and said tool inserts are disposed on said disk circumfery.

9. The apparatus according to claim 1, wherein said disk includes at least one face perpendicular to said second axis, and wherein said tool inserts are disposed on said at least one disk face.

10. The apparatus according to claim 1, wherein said means for mounting said tool inserts comprises a V-shaped edge on said disk and means connecting said tool inserts to said V-shaped disk edge.

11. The apparatus according to claim 1, wherein said means for mounting said tool inserts comprises a matching plurality of pockets on said disk, each of said pockets receiving at least part of one of said tool inserts therein.

12. The apparatus according to claim 11, wherein each of said pockets includes a chip gullet.

13. The apparatus according to claim 12, wherein each of said chip gullets is acutely angled with respect to the plane of said disk.

14. The apparatus according to claim 1, wherein said lead angle is between 45 and 60 degrees.

* * * * *